United States Patent
Sawada et al.

(10) Patent No.: US 9,554,425 B2
(45) Date of Patent: Jan. 24, 2017

(54) INDUCTION HEATING DEVICE

(75) Inventors: Daisuke Sawada, Hyogo (JP); Yuji Fujii, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 615 days.

(21) Appl. No.: 14/002,293

(22) PCT Filed: Sep. 7, 2012

(86) PCT No.: PCT/JP2012/005692
§ 371 (c)(1),
(2), (4) Date: Aug. 29, 2013

(87) PCT Pub. No.: WO2013/084386
PCT Pub. Date: Jun. 13, 2013

(65) Prior Publication Data
US 2013/0334212 A1  Dec. 19, 2013

(30) Foreign Application Priority Data

Dec. 6, 2011  (JP) .................................. 2011-266582
Dec. 20, 2011  (JP) ................................ 2011-278110

(51) Int. Cl.
*H05B 6/06* (2006.01)
*H05B 6/04* (2006.01)

(52) U.S. Cl.
CPC .................................... *H05B 6/065* (2013.01)

(58) Field of Classification Search
CPC ............ H05B 6/065; H05B 6/06; H05B 6/04; H05B 6/08; H05B 6/101; H05B 6/40
(Continued)

(56) References Cited

U.S. PATENT DOCUMENTS 3,821,509 A * 6/1974 Amagami et al. ..... H02H 7/122
219/625
2003/0164373 A1  9/2003 Hirota et al.
(Continued)

FOREIGN PATENT DOCUMENTS

CN  2618402 Y  5/2004
CN  1845644 A  10/2006
(Continued)

OTHER PUBLICATIONS

JP-2004-235032., Induction Heating Cooker, Aug. 19, 2004, The JPO, machine translation.*
(Continued)

*Primary Examiner* — Quang Van
(74) *Attorney, Agent, or Firm* — Brinks Gilson & Lione

(57) ABSTRACT

An induction heating device includes: a rectifying circuit that rectifies an AC power supply; a smoothing capacitor that smooths the rectified output to obtain a DC power supply; a first and a second inverters each composed of a heating coil, a resonance capacitor, and a switching element, and connected to the smoothing capacitor in parallel; a first and a second oscillating circuits that supply drive signals to the switching elements; and a controller that controls drive of the first and second oscillating circuits. The controller alternately drives the first and second oscillating circuits, and controls a drive time ratio of the first and second oscillating circuits so that a power change amount generated every time the drive is switched between the first and second oscillating circuits is not more than a predetermined amount.

5 Claims, 8 Drawing Sheets

(58) Field of Classification Search
USPC .................. 219/620, 624–625, 632, 660, 661–665,219/668; 363/57
See application file for complete search history.

(56) References Cited

U.S. PATENT DOCUMENTS

| 2011/0163086 A1 | 7/2011 | Aldana Arjol et al. |
| 2012/0152935 A1 | 6/2012 | Kitaizumi et al. |

FOREIGN PATENT DOCUMENTS

| EP | 1 951 003 A1 | 7/2008 |
| EP | 2 528 412 A1 | 11/2012 |
| JP | 05-166579 A | 7/1993 |
| JP | 2001-196156 A | 7/2001 |
| JP | 2004-220928 A | 8/2004 |
| JP | 2004-235032 A | 8/2004 |
| JP | 2009-211876 A | 9/2009 |
| WO | WO 2011/089900 A1 | 7/2011 |

OTHER PUBLICATIONS

Office Action and Search Report, and partial English language translation thereof, in corresponding Chinese Application No. 201280010721.X, dated Nov. 19, 2014, 7 pages.

Extended European Search Report in corresponding European Application No. 12855730.3, dated Mar. 20, 2015, 4 pages.

International Search Report for International Application No. PCT/JP2012/005692, dated Oct. 9, 2012, 2 pages.

International Search Report for corresponding International Application No. PCT/JP2012/005689, dated Oct. 9, 2012, 1 page.

Translation of International Preliminary Report on Patentability for corresponding International Application No. PCT/JP2012/005689, dated Jul. 10, 2014, 6 pages.

Office Action and Search Report, and partial English translation thereof, in corresponding Chinese Application No. 201280011044.3, dated Nov. 15, 2014, 9 pages.

Extended European Search Report in corresponding European Application No. 12863665.1, dated Jun. 5, 2015, 6 pages.

Office Action in corresponding U.S. Appl. No. 14/002,224, dated Feb. 19, 2016, 6 pages.

International Preliminary Report on Patentability, and English translation thereof, in corresponding International Application No. PCT/JP2012/005692, dated Jun. 19, 2014, 11 pages.

Office Action in corresponding U.S. Appl. No. 14/002,224, dated Oct. 26, 2016, 7 pages.

Office Action in corresponding U.S. Appl. No. 14/002,224, dated Jun. 21, 2016, 7 pages.

Advisory Action in corresponding U.S. Appl. No. 14/002,224, dated Aug. 31, 2016, 3 pages.

\* cited by examiner

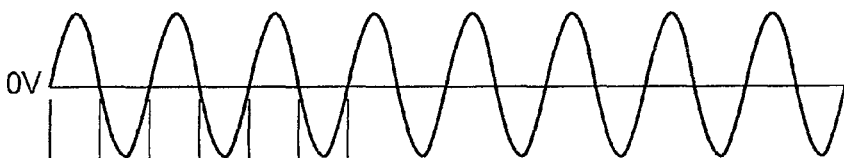
*Fig.2A* AC POWER SUPPLY 1
*Fig.2B* ZERO-VOLT DETECTING CIRCUIT 9
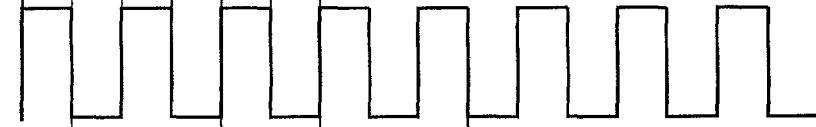
*Fig.2C* OSCILLATING CIRCUIT 7a
*Fig.2D* OSCILLATING CIRCUIT 7b
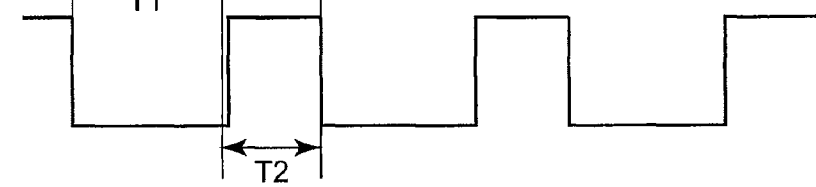
*Fig.2E* SWITCHING ELEMENT 6a
*Fig.2F* SWITCHING ELEMENT 6b
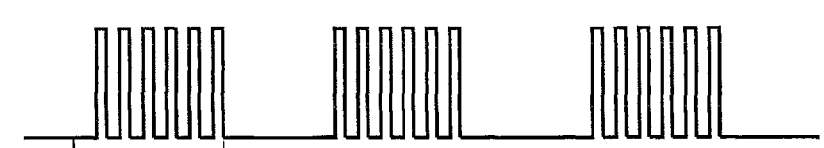
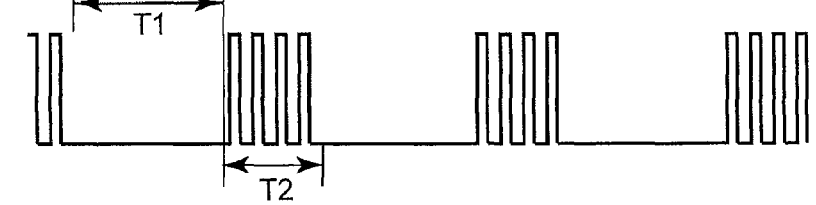
*Fig.2G* OUTPUT POWER OF INDUCTION HEATING DEVICE
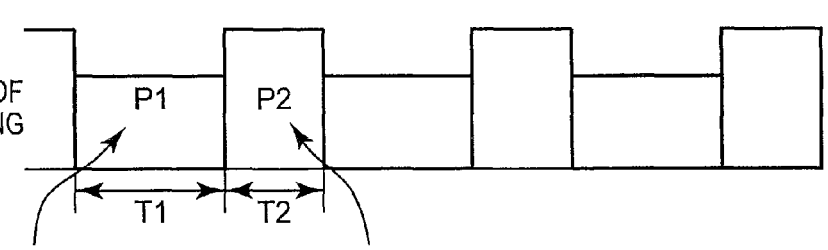
OUTPUT POWER OF FIRST INVERTER   OUTPUT POWER OF SECOND INVERTER

*Fig.3A*
AC POWER SUPPLY 1
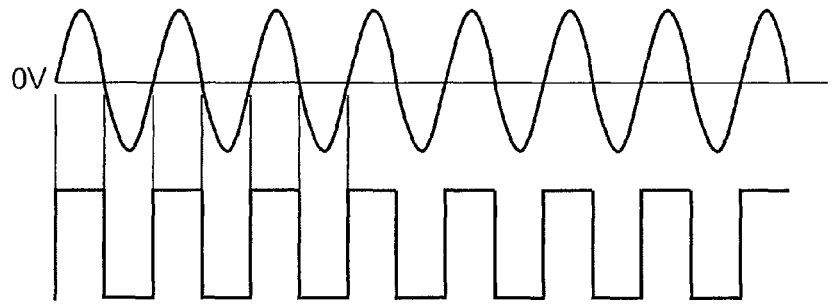
*Fig.3B*
ZERO-VOLT DETECTING CIRCUIT 9
*Fig.3C*
OSCILLATING CIRCUIT 7a
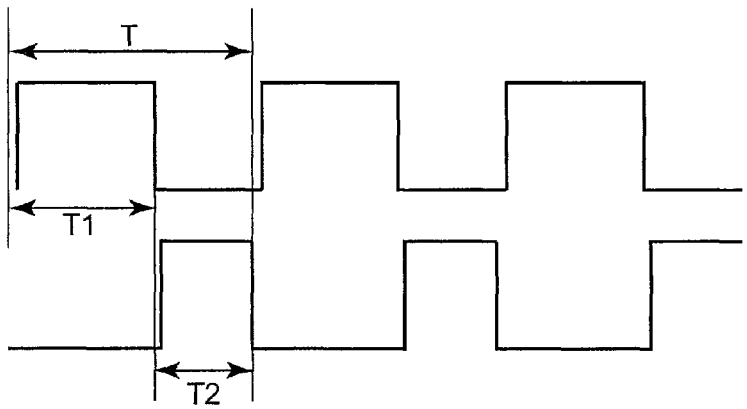
*Fig.3D*
OSCILLATING CIRCUIT 7b
*Fig.3E*
SWITCHING ELEMENT 6a
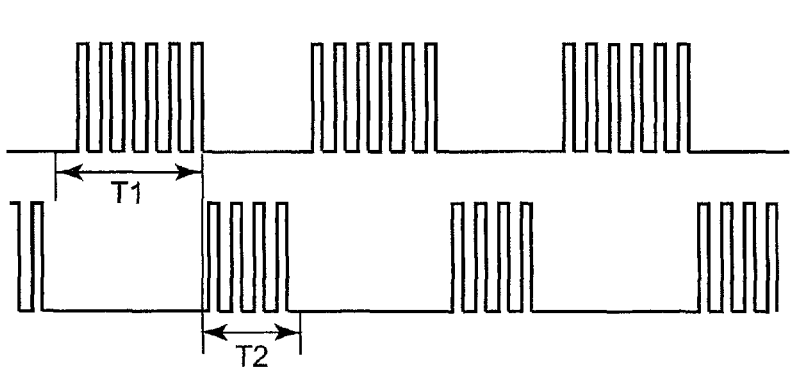
*Fig.3F*
SWITCHING ELEMENT 6b
*Fig.3G*
OUTPUT POWER OF INDUCTION HEATING DEVICE
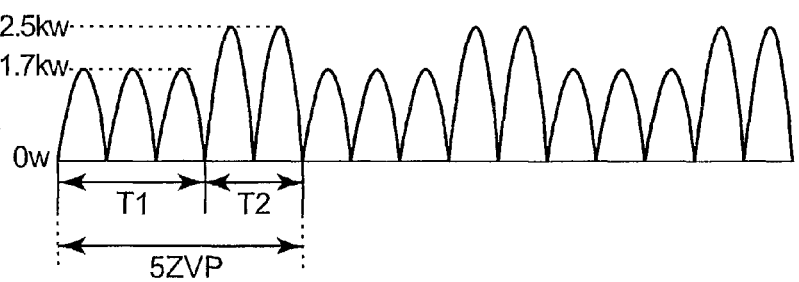

*Fig.4A*
AC POWER SUPPLY 1
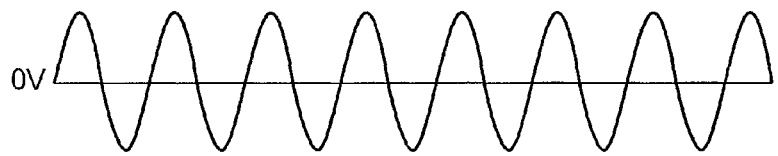
*Fig.4B*
ZERO-VOLT DETECTING CIRCUIT 9
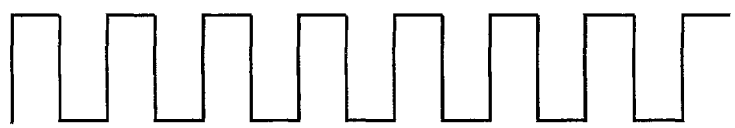
*Fig.4C*
OSCILLATING CIRCUIT 7a
*Fig.4D*
OSCILLATING CIRCUIT 7b
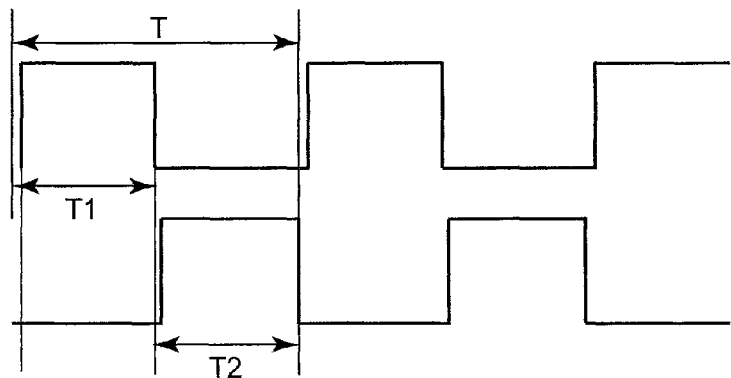
*Fig.4E*
SWITCHING ELEMENT 6a
*Fig.4F*
SWITCHING ELEMENT 6b
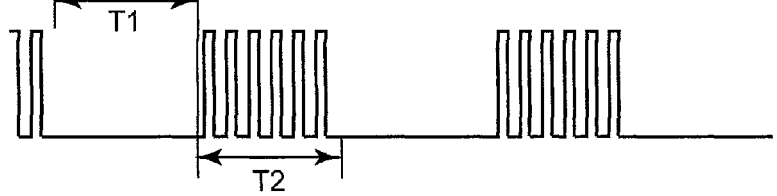
*Fig.4G*
OUTPUT POWER OF INDUCTION HEATING DEVICE
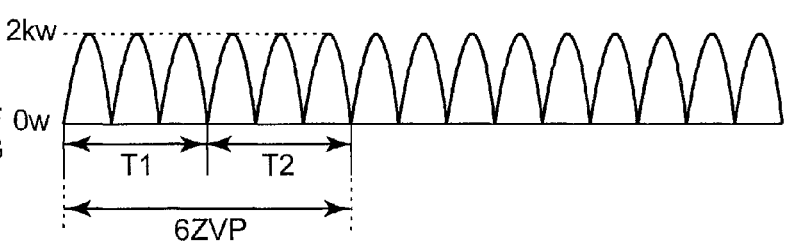

*Fig.5A*
AC POWER SUPPLY 1
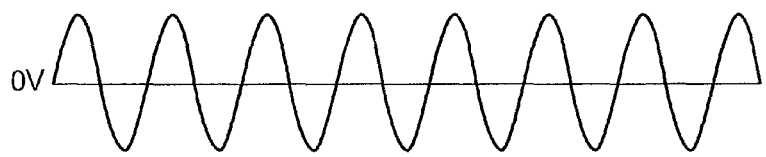
*Fig.5B*
ZERO-VOLT DETECTING CIRCUIT 9
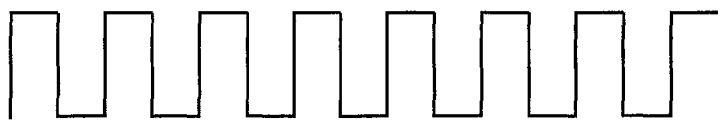
*Fig.5C*
OSCILLATING CIRCUIT 7a
*Fig.5D*
OSCILLATING CIRCUIT 7b
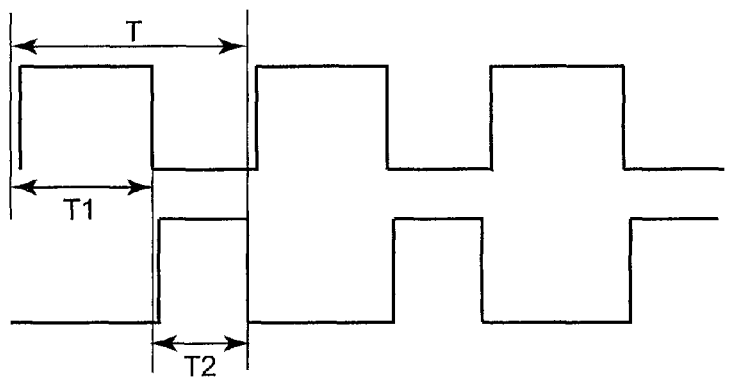
*Fig.5E*
OUTPUT POWER OF INDUCTION HEATING DEVICE
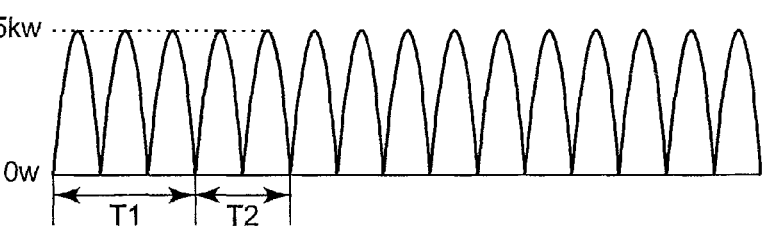

*Fig.6A*
AC POWER SUPPLY 1
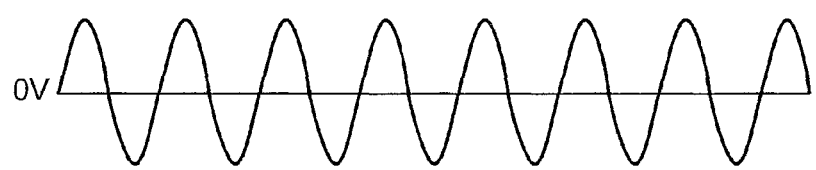
*Fig.6B*
ZERO-VOLT DETECTING CIRCUIT 9
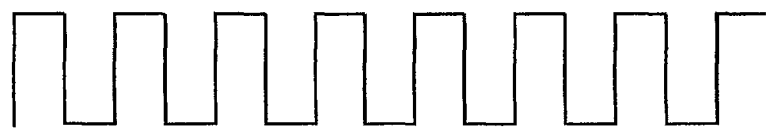
*Fig.6C*
OSCILLATING CIRCUIT 7a
*Fig.6D*
OSCILLATING CIRCUIT 7b
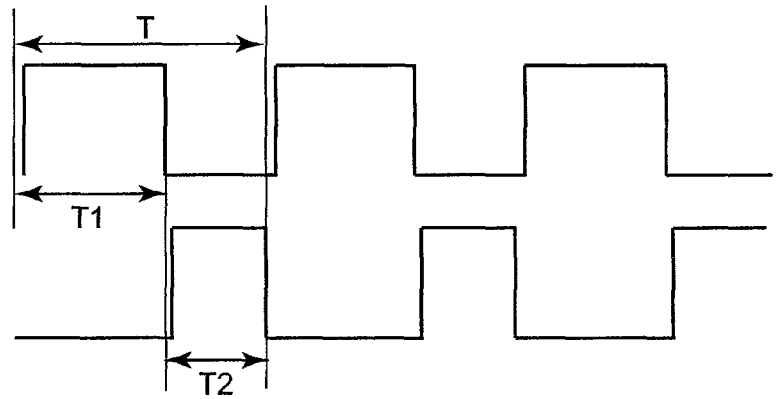
*Fig.6E*
OUTPUT POWER OF INDUCTION HEATING DEVICE
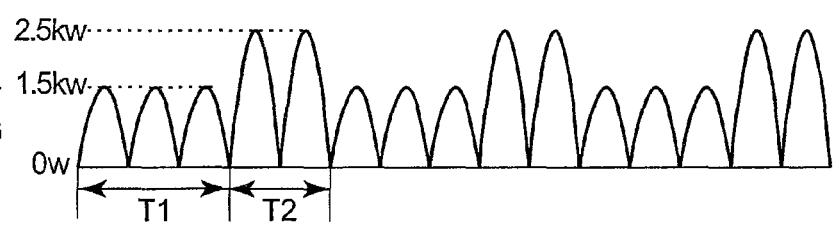

*Fig.7A*
AC POWER SUPPLY 1
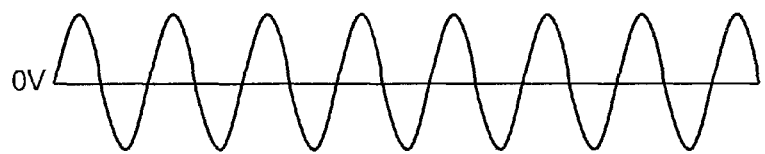
*Fig.7B*
ZERO-VOLT DETECTING CIRCUIT 9
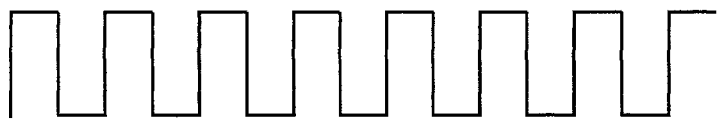
*Fig.7C*
OSCILLATING CIRCUIT 7a
*Fig.7D*
OSCILLATING CIRCUIT 7b
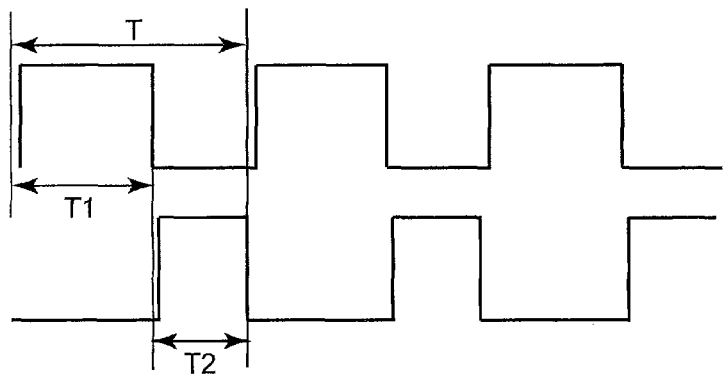
*Fig.7E*
OUTPUT POWER OF INDUCTION HEATING DEVICE
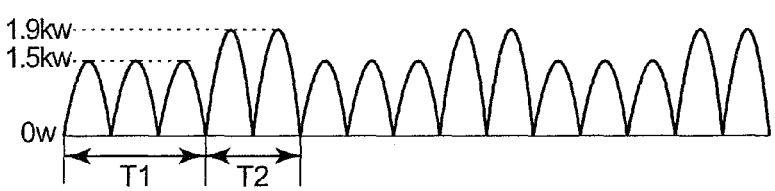

INDUCTION HEATING DEVICE

This application is a 371 application of PCT/JP2012/005692 having an international filing date of Sep. 7, 2012, which claims priority to JP2011-266582 filed Dec. 6, 2011 and JP2011-278110 filed Dec. 20, 2011, the entire contents of which are incorporated herein by reference.

TECHNICAL FIELD

The present invention relates to an induction heating device including a plurality of inverters, and having a control function to switch and drive the respective inverters, individually.

BACKGROUND ART

A conventional induction heating device will be described with reference to the drawing.

FIG. 8 shows a circuit configuration of the conventional induction heating device. In circuits shown in FIG. 8, a rectifying circuit 22 rectifies an AC power supply 21, and a smoothing circuit 23 smooths the rectified output to obtain a DC power supply. An inverter 31*a* is composed of a heating coil 24*a*, a resonance capacitor 25*a*, and a switching element 26*a*. An inverter 31*b* is composed of a heating coil 24*b*, a resonance capacitor 25*b*, and a switching element 26*b*. An oscillating circuit 27*a* drives the switching element 26*a* included in the inverter 31*a*. An oscillating circuit 27*b* drives the switching element 26*b* included in the inverter 31*b*. An input current detecting circuit 28 detects a value of an input current, and a power supply voltage detecting circuit 29 detects a voltage of the AC power supply. A microcomputer 30 controls oscillations of the inverters 31*a* and 31*b*, based on the values detected by the input current detecting circuit 28 and the power supply voltage detecting circuit 29.

In the above configuration, the microcomputer 30 controls the oscillating circuits 27*a* and 27*b* so that the oscillating circuits 27*a* and 27*b* are alternately driven. Further, the microcomputer 30 calculates a power value based on a current value detected by the input current detecting circuit 28 and a voltage value detected by the power supply voltage detecting circuit 29 while controlling the oscillating circuit 27*a*, and uses the calculated power value in correcting a power of the inverter 31*a* or the like. Similarly, the microcomputer 30 calculates a power value based on the current value input by the input current detecting circuit 28 and the voltage value input by the power supply voltage detecting circuit 29 while controlling the oscillating circuit 27*b*, and uses the calculated power value in correcting the power of the inverter 31*b* or the like (refer to patent document 1, for example).

Patent Document 1: JP 2001-196156 A

SUMMARY OF THE INVENTION

Problems to be Solved by the Invention

In the above-described induction heating device, it will be considered a case in which, while the inverters 31*a* and 31*b* are intermittently driven by the oscillating circuits 27*a* and 27*b* as described above, for instance, alternately driven every half cycle, the inverter 31*a* outputs a power of 2 kW, and the inverter 31*b* outputs a power of 1 kW, as one example. In this case, the inverter 31*a* needs to output a power of 4 kW in the half cycle to output an average power of 2 kW. Similarly, the inverter 31*b* needs to output a power of 2 kW in the half cycle to output an average power of 1 kW. Thus, every time the oscillating circuits 27*a* and 27*b* alternately drive the inverters 31*a* and 31*b* every half cycle, the output power of the induction heating device largely changes between 4 kW and 2 kW. Further, in a case where the inverters 31*a* and 31*b* are driven so that the output power of the induction heating device does not largely change even when the oscillating circuits 27*a* and 27*b* are alternately driven, the output of the inverter (either one of the inverters 31*a* and 31*b*) on which a small-diameter pan or a non-magnetic stainless pan is put is reduced in some arts to protect the switching elements when the small-diameter pan or the non-magnetic stainless pan is heated. In this case also, the output power of the induction heating device largely changes periodically. When such induction heating device is used in a home, an AC voltage in the home changes in synchronization with the output power of this induction heating device, and a lighting flicker could be generated, for example.

In order to solve the above conventional problem, the present invention provides an induction heating device capable of preventing a flicker phenomenon such as a flicker of a lighting equipment, caused by a change of an output power generated due to alternate drive of two inverters.

Means for Solving the Problem

In order to solve the above conventional problem, an induction heating device according to the present invention includes a rectifying circuit that rectifies an AC power supply; a smoothing capacitor that smooths the rectified output to obtain a DC power supply; a first and a second inverters each composed of a heating coil, a resonance capacitor, and a switching element, and connected to the smoothing capacitor in parallel; a first and a second oscillating circuits that supply drive signals to the switching elements; and a controller that controls drive of the first and second oscillating circuits. The controller alternately drives the first and second oscillating circuits, and controls a drive time ratio of the first and second oscillating circuits so that a power change amount generated every time the drive is switched between the first and second oscillating circuits is not more than a predetermined amount.

Further, when one output power of the first or second inverter is limited to a power smaller than a power required to obtain a set power, the controller may limit the other output power of the first or second inverter so that a difference between the output power of the first inverter and the output power of the second inverter is not more than the predetermined amount.

Effects of the Invention

According to the above configuration, the power change amount generated due to the alternate drive of the two inverters is reduced. As a result, the flicker phenomenon (such as the flicker of the lighting equipment) can be prevented from being generated, or kept at a level in which a user does not feel strangeness.

BRIEF DESCRIPTION OF THE DRAWINGS

FIGS. 2A to 2G are views showing control timing of two oscillating circuits according to the first or second embodiment of the present invention.

FIGS. 3A to 3G are views showing operations of switching elements and an output power of the induction heating device when the two oscillating circuits are alternately driven in a cycle of five ZVPs in the first embodiment of the present invention.

FIGS. 4A to 4G are views showing operations of switching elements and an output power of the induction heating device when the two oscillating circuits are alternately driven in a cycle of six ZVPs in the first embodiment of the present invention.

FIGS. 5A to 5E are views showing a change of the output power of the induction heating device when set powers of the two inverters are 1.5 kW and 1 kW, respectively in the second embodiment of the present invention.

FIGS. 6A and 6E are views showing a change of the output power of the induction heating device when a first inverter heats a small-diameter pan or non-magnetic stainless pan in the second embodiment of the present invention.

FIGS. 7A to 7E are views showing a change of the output power of the induction heating device when an output power of a second inverter is limited based on a reference value of a power change in the second embodiment of the present invention.

DETAILED DESCRIPTION OF THE PREFERRED EMBODIMENTS

Figure 1:
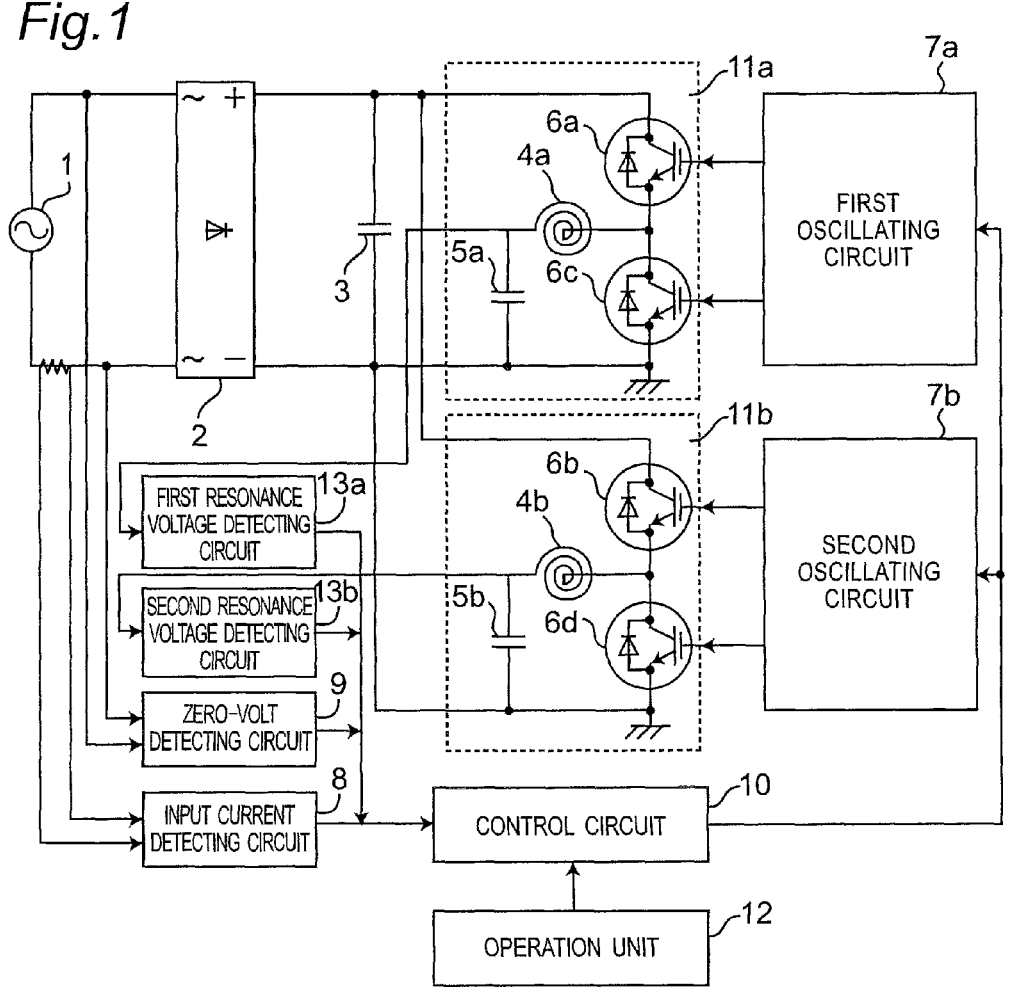
FIG. 1 is a view showing a circuit configuration of an induction heating device according to a first or second embodiment of the present invention.
Figure 8:
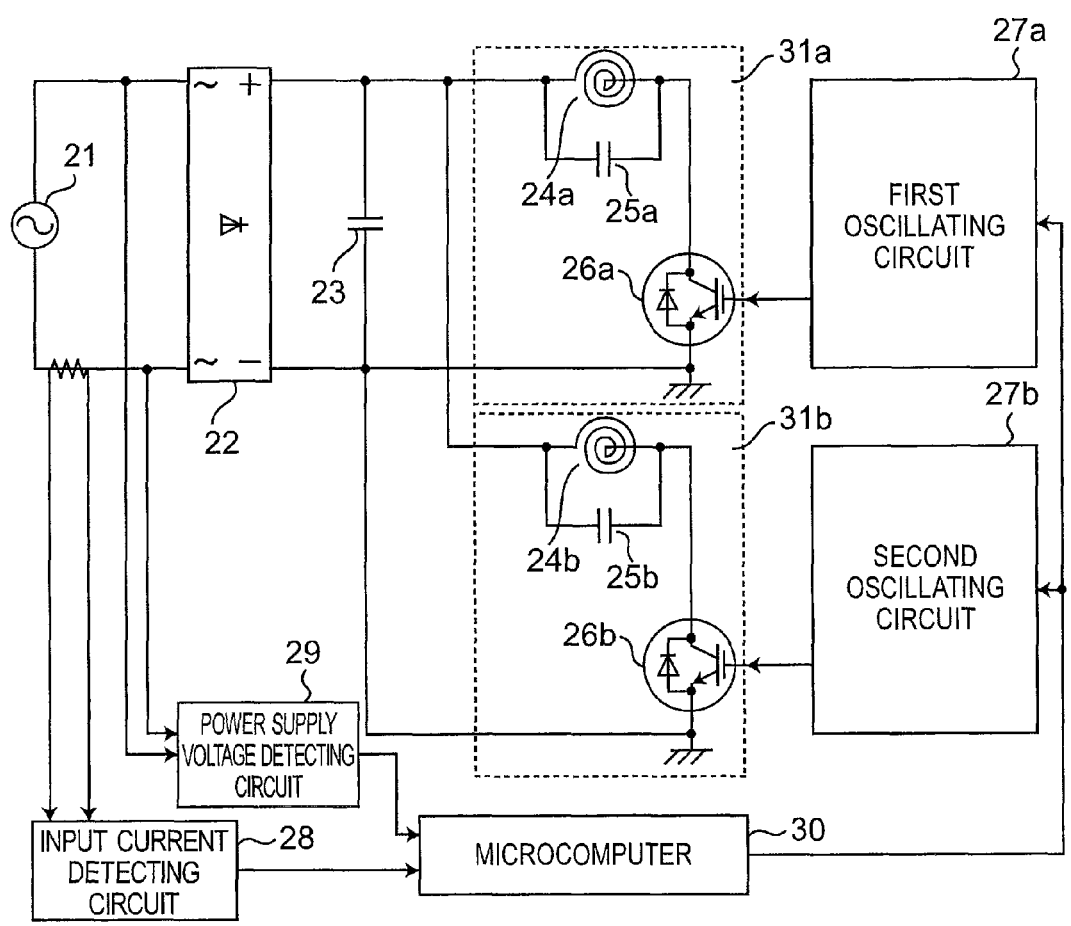
FIG. 8 is a view showing a circuit configuration of a conventional induction heating device.

An induction heating device according to a first invention includes a rectifying circuit that rectifies an AC power supply; a smoothing capacitor that smooths the rectified output to obtain a DC power supply; a first and a second inverters each composed of a heating coil, a resonance capacitor, and a switching element, and connected to the smoothing capacitor in parallel; a first and a second oscillating circuits that supply drive signals to the switching elements; and a controller that controls drive of the first and second oscillating circuits. The controller alternately drives the first and second oscillating circuits, and controls a drive time ratio of the first and second oscillating circuits so that a power change amount generated every time the drive is switched between the first and second oscillating circuits is not more than a predetermined amount. Thus, the power change amount generated due to the alternate drive of the two inverters can be limited. As a result, the flicker of the lighting equipment or the like can be prevented from being generated, or kept at a level in which a user does not feel strangeness.

According to an induction heating device in a second invention, in the induction heating device according to the first invention especially, the controller alternately drives the first and second oscillating circuits, and when one output power of the first or second inverter is limited to a power smaller than a power required to obtain a set power, the controller reduces the other output power of the first or second inverter so that a difference between the output power of the first inverter and the output power of the second inverter is not more than the predetermined amount. Thus, the power change amount generated due to the alternate drive of the two inverters can be limited. As a result, the flicker of the lighting equipment or the like can be prevented from being generated, or kept at the level in which the user does not feel strangeness.

According to an induction heating device in a third invention, in the induction heating device according to the first or second invention especially, the predetermined amount is not more than a power amount corresponding to a voltage change rate of the AC power supply in which a short-time flicker value Pst is one. Thus, the power change amount generated due to the alternate drive of the two inverters can be limited below or equal to a border line whether people feel the flicker terrible. As a result, the flicker of the lighting equipment or the like can be prevented from being generated, or kept at the level in which the user does not feel strangeness.

According to an induction heating device in a fourth invention, in the induction heating device according to any one of the first to third inventions especially, the controller performs control such that a cycle time of the alternate drive of the first and second oscillating circuits is not more than 300 milliseconds, and number of drive switching operations between the first and second oscillating circuits per minute is not less than 400. Thus, when the first and second oscillating circuits are controlled by an intermittent operation in which heating and stopping are alternately performed, an off-and-on boiling state which is likely to be generated in an object to be heated particularly in boiling water or the like can be kept at a level in which a user does not notice or does not feel strangeness. As a result, the above state can be prevented from being falsely recognized as a failure of an equipment.

According to an induction heating device in a fifth invention, in the induction heating device according to any one of the first to fourth inventions especially, a zero-volt detecting circuit that detects a zero point of the AC power supply is included. The controller switches the drive between the first and second oscillating circuits, based on timing at which the zero point of the AC power supply is detected by the zero-volt detecting circuit. Thus, an instantaneous value of the AC power supply at the time of switching the drive between the first and second oscillating circuits is a lower voltage, compared with a time when the instantaneous value of the AC power supply is high, so that a charge voltage to the smoothing capacitor can be low. As a result, a rush current generated at the time of an initial operation of each of the first and second inverters can be lowered, so that an abnormal sound such as a pan rap or growl sound can be prevented from being generated.

Hereinafter, embodiments of the present invention will be described with reference to the drawings. Note that the present invention is not limited to the embodiments.

1. First Embodiment

1-1. Configuration of Induction Heating Device

FIG. 1 is a view showing a circuit configuration of an induction heating device according to a first embodiment of the present invention.

As for circuits shown in FIG. 1, a rectifying circuit 2 is a rectifying circuit that rectifies an AC power supply 1. A smoothing capacitor 3 smooths the rectified output to obtain a DC power supply. A first inverter 11a is composed of a first heating coil 4a, a first resonance capacitor 5a, and first switching elements 6a and 6c. A second inverter 11b is composed of a second heating coil 4b, a second resonance capacitor 5b, and second switching elements 6b and 6d. The first and second inverters 11a and 11b are connected to the smoothing capacitor 3 in parallel, and invert the DC power supply to an alternate current. A first oscillating circuit 7a drives the first switching elements 6a and 6c in the first inverter 11a. A second oscillating circuit 7b drives the second switching elements 6b and 6d in the second inverter 11b. An input current detecting circuit 8 detects a value of an input current. A zero-volt detecting circuit 9 detects a timing (zero point) of positive and negative voltage inversion of an AC power supply voltage. A first resonance voltage detecting circuit 13a detects a value of a resonance voltage of the first resonance capacitor 5a. A second resonance voltage detecting circuit 13b detects a value of a resonance voltage of the second resonance capacitor 5b. An operation unit 12 receives operations such as selection of heat/stop and a power adjustment (heating power) for an object to be heated (cooking object) from a user. A control circuit 10 includes a microcomputer. The control circuit 10 controls oscillations of the first and second inverters 11a and 11b, based on values detected by the input current detecting circuit 8, the zero-volt detecting circuit 9, and the first and second resonance voltage detecting circuits 13a and 13b, and a heat setting set in the operation unit 12. The induction heating device (electromagnetic cooker represented by an IH cooking heater) according to the present embodiment with the above configuration can inductively heat objects to be heated such as a pan put on the first or second heating coils 4a or 4b via a top panel, by an eddy current generated due to magnetic coupling to the first and second heating coils 4a and 4b.

The control circuit 10 controls the first and second oscillating circuits 7a and 7b so that each of the first and second inverters 11a and 11b outputs a power corresponding to a heat power setting received by the operation unit 12. Hereinafter, the output power of each of the first and second inverters 11a and 11b corresponding to the heat power setting set by the user is referred to as "set power".

FIGS. 2A to 2G are views showing control timing of the two oscillating circuits 7a and 7b according to the present embodiment.

Referring to FIG. 2A indicates a voltage level of the AC power supply 1, FIG. 2B indicates a detection signal (output signal) of the zero-volt detecting circuit 9, FIGS. 2C and 2D indicate operation states of the first and second oscillating circuits 7a and 7b, respectively, FIGS. 2E and 2F indicate drive signals of the first and second switching elements 6a and 6b, respectively, and FIG. 2G indicates an output power of the induction heating device.

Note that each of the first switching elements 6a and 6c, and the second switching elements 6b and 6d according to the present embodiment is driven by a predetermined switching cycle (for example, high-frequency cycle of 16 kHz or more which is not audible to the human ear), regardless of the set powers of the first and second inverters 11a and 11b. An upper limit of an on-time of each of the first and second switching elements 6a and 6b is set to a half time of the switching cycle. Further, the first switching element 6c and the second switching element 6d are exclusively driven with respect to the first switching element 6a and the second switching element 6b, respectively. Thus, a lower limit of an on-time of each of the first and second switching elements 6c and 6d is the half time of the switching cycle. Therefore, when the on-time of each of the first switching elements 6a and 6c and the second switching elements 6b and 6d is the half of the switching cycle, the output power of each of the inverters 11a and 11b is maximum.

1-2. Operation of Induction Heating Device

Hereinafter, an operation and a mechanism of the induction heating device configured as described above will be described.

1-2-1. Outline of Operation

First, a description will be given of an outline of switching timing between the first and second oscillating circuits 7a and 7b, and operation timing of the first switching elements 6a and 6c and the second switching elements 6b and 6d.

When the heating operation of the first and second inverters 11a and 11b is selected in the operation unit 12, the control circuit 10 which received the signal from the operation unit 12 starts to send respective control signals to the first and second oscillating circuits 7a and 7b so that the first and second oscillating circuits 7a and 7b drive the first switching elements 6a and 6c, and the second switching elements 6b and 6d.

As shown in FIG. 2C, a drive period of the first oscillating circuit 7a by the control circuit 10 is a period T1. As shown in FIG. 2D, a drive period of the second oscillating circuit 7b is a period T2. As shown in FIG. 2E, the first switching elements 6a and 6c are driven by the first oscillating circuit 7a in the period T1, according to the above-described predetermined switching cycle which is shorter than the periods T1 and T2. As shown in FIG. 2F, the second switching elements 6b and 6d are driven by the second oscillating circuit 7b in the period T2, according to the above-described predetermined switching cycle which is shorter than the periods T1 and T2. That is, the first and second oscillating circuits 7a and 7b are operated intermittently in the periods T1 and T2, respectively, and alternately in a predetermined cycle T (T1+T2). Thus, the first switching elements 6a and 6c and the second switching elements 6b and 6d are also driven intermittently in the periods T1 and T2, respectively, and alternately in the predetermined cycle T, according to the predetermined switching cycle which is shorter than the periods T1 and T2.

A description will be given of the timing to switch the operation between the first and second oscillating circuits 7a and 7b by the control circuit 10. As shown in FIGS. 2A and 2B, the zero-volt detecting circuit 9 outputs a high-level signal when a voltage level of the AC power supply 1 is in a positive side, and outputs a low-level signal when the voltage level of the AC power supply 1 is on a negative side. Then, the zero-volt detecting circuit 9 outputs a falling edge from the high level to the low level and a rising edge from the low level to the high level when the voltage level of the AC power supply 1 is in the vicinity of a zero point. Therefore, the detection signal (output signal) of the zero-volt detecting circuit 9 is a pulse signal of the cycle of the AC power supply.

The control circuit 10 detects the zero point of the AC power supply 1 with the output signal of the zero-volt detecting circuit 9, and switches the operation between the first and second oscillating circuits 7a and 7b in the vicinity of the zero point of the AC power supply 1. For example, in the case where the operation is switched from the first oscillating circuit 7a to the second oscillating circuit 7b, when the zero-volt detecting circuit 9 outputs the rising or falling edge, the control circuit 10 stops the operation of the first operating oscillating circuit 7a in operation at first and then starts the operation of the second oscillating circuit 7b. That is, when the voltage level of the AC power supply 1 reaches the zero point, the operation of the first oscillating circuit 7a is stopped, and after a time of the zero point, the operation of the second oscillating circuit 7b is started. The same is true for the switching from the operation of the second oscillating circuit 7b to the operation of the first oscillating circuit 7a.

Further, since the operations between the first and second oscillating circuits 7a and 7b are switched in the vicinity of the zero point of the AC power supply 1, the operation period T1 of the first oscillating circuit 7a and the operation period T2 of the second oscillating circuit 7b are set in units of the half cycle of the AC power supply cycle (that is, each of the operation period T1 of the first oscillating circuit 7a and the operation period T2 of the second oscillating circuit 7b is set to the integral multiple of the half cycle of the AC power supply cycle). Hereinafter, a length of the half of the AC power supply cycle is referred to as "ZVP (zero volt pulse)". As shown in FIGS. 2B to 2D, the period T1 corresponds to three pulses of the ZVP (three ZVPs), and the period T2 corresponds to two pulses of the ZVP (two ZVPs). Thus, the first and second oscillating circuits 7a and 7b are alternately operated in a cycle of five ZVPs.

When the first and second oscillating circuits 7a and 7b are operated in this way, as shown in FIG. 2G, the output power of the induction heating device is an output power P1 from the first inverter 11a in the period T1, and is an output power P2 from the second inverter 11b in the period T2. Therefore, the output power of the induction heating device changes between the output power P1 and the output power P2 every time the first and second oscillating circuits 7a and 7b are alternately operated. Since the intermittent operation is performed such that the first inverter 11a is operated in the three ZVPs of the cycle of five ZVPs, the output power for one cycle of the induction heating device from the first inverter 11a is an average power of 3/5 time of the output power P1. Further, since the intermittent operation is performed such that the second inverter 11b is operated in the two ZVPs of the cycle of five ZVPs, the output power for one cycle of the induction heating device from the second inverter 11b is an average power of 2/5 time of the output power P2.

1-2-2. Operation to Determine Switching Cycle of Oscillating Circuit

Next, a description will be given of a case in which the set powers of the first and second inverters 11a and 11b are both set to 1 kW, with reference to FIGS. 3A to 3G and FIGS. 4A and 4G. FIG. 3A to 3G are views showing operations of switching elements and an output power of the induction heating device when the two oscillating circuits according to the present embodiment are alternately driven in the cycle of five ZVPs. FIGS. 4A and 4G are views showing operations of switching elements and an output power of the induction heating device, when the two oscillating circuits according to the present embodiment are alternately driven in a cycle of six ZVPs.

Referring to FIGS. 3A to 3G and FIGS. 4A and 4G, FIGS. 3A and 4A indicate a voltage level of the AC power supply, FIGS. 3B and 4B indicate a detection signal (output signal) of the zero-volt detecting circuit 9, FIGS. 3C and 4C, and 3D and 4D indicate operation states of the first and second oscillating circuits 7a and 7b, respectively, FIGS. 3E and 4E, and 3F and 4F indicate drive signals of the first and second switching elements 6a and 6b, respectively, and FIGS. 3G and 4G indicate an output power of the induction heating device.

As described above, the first and second oscillating circuits 7a and 7b are operated intermittently in the periods T1 and T2, respectively, and alternately in the predetermined cycle T. The control circuit 10 controls the first and second oscillating circuits 7a and 7b so that the first and second inverters 11a and 11b are operated in the cycle of five ZVPs or six ZVPs, regardless of the set power of each of the first and second inverters 11a and 11b. Further, the periods T1 and T2 are changed based on the set power of each of the first and second inverters 11a and 11b.

The cycle T needs to be determined so that a time for one cycle is 300 milliseconds or less, and number of the switching operations between the first and second oscillating circuits 7a and 7b per minute is 400 or more. The purpose of determining the cycle T as described above is to control a degree of an off-and-on boiling state which is likely to be generated in the object to be heated in boiling water or the like especially, while the induction heating device performs the intermittent operation in which the heating operation and the stop are alternately performed.

Hereinafter, a concrete method for determining the cycle T will be described. Here, a frequency of the AC power supply 1 is 50 Hz or 60 Hz. Therefore, length of the half cycle (ZVP) of the output of the AC power supply 1 is 10 milliseconds when the frequency is 50 Hz, and is 8.3 milliseconds when the frequency is 60 Hz. Therefore, the cycle T of five ZVPs is 50 milliseconds when the frequency is 50 Hz, and is 42 milliseconds when the frequency is 60 Hz. Further, the cycle T of six ZVPs is 60 milliseconds when the frequency is 50 Hz, and is 50 milliseconds when the frequency is 60 Hz. Therefore, both of the cycle T of six ZVPs and the cycle T of five ZVPs satisfies the above condition. The same is true for the number of the switching operations between the first and second oscillating circuits 7a and 7b per minute. When the fact that the two switching operations are generated every cycle is taken into account, the number of the switching operations per minute in the case where the cycle T is five ZVPs is 2400 when the frequency is 50 Hz, and is 2880 when the frequency is 60 Hz. Further, the number of the switching operations per minute in the case where the cycle is six ZVPs is 2000 when the frequency is 50 Hz, and is 2400 when the frequency is 60 Hz. Thus, as for the number of the switching operations per minute also, both of the cycle T of five ZVPs and cycle T of six ZVPs satisfies the condition.

Note that the cycle T is not limited to five ZVPs and six ZVPs, and there is no problem even when the cycle T is set to any value except for five ZVPs and six ZVPs as long as the above-described condition is satisfied. Since the time of the one cycle is set to 300 milliseconds or less, the cycle T can be set to any value within a range of up to 30 ZVPs when the frequency of the AC power supply 1 is 50 Hz, and the cycle T can be set to any value within a range of up to 36 ZVPs when the frequency of the AC power supply 1 is 60 Hz.

The periods T1 and T2 are determined as follows. The operation period T1 of the first oscillating circuit 7a is calculated based on a following formula.

(Period $T1$)=(cycle $T$)×(set power of first inverter $11a$)/(total of set powers of first and second inverters $11a$ and $11b$)

Since the periods T1 and T2 are determined with the half cycle of the AC power supply using as the minimum unit as described above, when the calculation result is indivisible, the calculation result is rounded off to the whole number.

The operation period T2 of the second oscillating circuit 7b is calculated based on a following formula.

(Period T2)=(cycle T)−(period T1)

In the above configuration, first, a description will be given of the case where the first and second oscillating circuits 7a and 7b are alternately operated in the cycle of five ZVPs, with reference to FIGS. 3A to 3G. When the set powers of the first and second inverters 11a and 11b are both set to 1 kW, the total of the set powers is 2 kW. Therefore, the operation periods T1 and T2 of the first and second oscillating circuits 7a and 7b are calculated such that T1=three ZVPs and T2=two ZVPs, based on the above formulas, respectively. Since the intermittent operation is performed such that the first inverter 11a is operated in the period of three ZVPs of the cycle of five ZVPs, and the average of the output power in the cycle T (that is, the set power) of the first inverter 11a is 1 kW, the output power needs to be 5/3 times the set power. Therefore, the output power of the first inverter 11a needs to be 1.7 kW in the period T1. Further, since the intermittent operation is performed such that the second inverter 11b is operated in the period of two ZVPs of the cycle of five ZVPs, and the average of the output power in the cycle T (that is, the set power) of the second inverter 11b is 1 kW, the output power needs to be 5/2 times the set power. Therefore, the output power of the second inverter 11b needs to be 2.5 kW in the period T2. Therefore, as shown in FIG. 3G, the output power of the induction heating device changes between 1.7 kW and 2.5 kW every time the first and second oscillating circuits 7a and 7b are alternately operated in the cycle of five ZVPs. Hereinafter, a difference between the output power of the first inverter 11a in the period T1 and the output power of the second inverter 11b in the period T2 is referred to as "power change amount". The power change amount in this case is 800 W (2.5 kW-1.7 kW).

Next, a description will be given of the case where the first and second oscillating circuits 7a and 7b are alternately operated in the cycle of six ZVPs, with reference to FIGS. 4A to 4G. The operation periods T1 and T2 of the first and second oscillating circuits 7a and 7b are calculated such that T1=three ZVPs and T2=three ZVPs, based on the above formulas, respectively. Since the intermittent operation is performed such that the first inverter 11a is operated in the period of three ZVPs of the cycle of six ZVPs, and the average of the output power of the first inverter 11a is 1 kW in the cycle T, the output power needs to be 6/3 times the set power. Therefore, the output power of the first inverter 11a needs to be 2 kW in the period T1. The output power of the second inverter 11b is similarly calculated. Since the intermittent operation is performed such that the second inverter 11b is operated in the period of three ZVPs of the cycle of six ZVPs, the output power of the second inverter 11b needs to be 2 kW in the period T2. Therefore, as shown in FIG. 4E, the output power of the induction heating device is constant at 2 kW while the first and second oscillating circuits 7a and 7b are alternately operated in the cycle of six ZVPs. That is, the power change amount in this case is zero W.

According to the present embodiment, the control circuit 10 sets the cycle T to five ZVPs or six ZVPs, based on whether the power change amount generated when the first and second oscillating circuits 7a and 7b are switched is a reference amount or lower. That is, the control circuit 10 alternately drives the first and second oscillating circuits 7a and 7b, and controls a drive time ratio (T1: T2) of the first and second oscillating circuits 7a and 7b so that the power change amount generated every time the drive is switched between the first and second oscillating circuits 7a and 7b is the reference amount or less. As a result, a flicker phenomenon such as a flicker of a lighting equipment can be prevented.

Here, the "reference amount" for the power change amount used in determining the cycle T is previously determined, in view of a flicker of a light caused by the power change generated when the first and second oscillating circuits 7a and 7b are switched. For example, the reference amount is determined as a maximum amount in a range of the power change amount which corresponds to a flicker whose degree is not felt terrible to the human eyes.

According to the present embodiment, a short-time flicker indicator is used as an index to determine this reference amount.

Hereinafter, a specific description will be given of the reference amount for the power change amount used in determining the cycle T. When an equipment having a relatively high load such as the induction heating device or the like is operated, a light such as an incandescent lamp is dimmed in some cases. This is because a large current flows due to the operation of the equipment and thus the AC power supply voltage is lowered. To prevent such flicker of the light, there is an international standard to limit the change in the current consumption of an equipment. Particularly, there is an index called the short-time flicker indicator Pst in which severity of the flicker is quantified based on characteristics of the human eyes. The short-time flicker indicator Pst is a graph in which a border line indicating whether the human feels the flicker terrible is defined as one. In general, the abscissa axis of the graph of the short-time flicker indicator Pst indicates number of step-shaped voltage changes per minute, and the ordinate axis indicates a magnitude of a voltage change when a rated voltage is set to 100%. When the AC power supply 1 according to the present embodiment is 240 V/50 Hz, and the cycle T is five ZVPs, the number of the switching operations between the first and second oscillating circuits 7a and 7b per minute is 2400, as described above. Thus, the number of the voltage changes is also 2400. Here, according to the short-time flicker indicator Pst, when the number of the voltage changes per minute is 2400, the magnitude of the voltage change on the border line (Pst=1) is 0.75%. Therefore, the power change amount corresponding to the magnitude of the voltage change of 0.75% which satisfies that Pst=1 is calculated from impedance Zref=0.47Ω (=0.4Ω+jn 0.25Ω) to be about 920 W through a following calculation.

(Voltage change amount)=(rated voltage)×(magnitude of voltage change satisfying that $Pst=1$)=240 (V)×0.75(%)/100=1.8 (V)

(Current change amount)=(voltage change amount)/Zref=1.8 (V)/0.47(Ω)=3.83 (A)

(Power change amount)=(rated voltage)×(current change amount)=240 (V)×3.83 (A)=919 (W)

The power change amount which satisfies that Pst=1 in the case where the cycle T is six ZVPs is similarly calculated. When the cycle T is six ZVPs, the number of the switching operations between the first and second oscillating circuits 7a and 7b per minute is 2000, and thus the voltage change number is also 2000. Further, according to the short-time flicker indicator Pst, the magnitude of the voltage change on the border line (Pst=1) is 0.5%. Therefore, the power change amount which satisfies that Pst=1 is calculated to be about 610 W. The reference amount is set to be not more than the power change amount calculated based on the flicker indicator Pst in each of the cases where the cycle T is five ZVPs and six ZVPs. In the present embodiment, in each of the cases where the cycle T is five ZVPs and six ZVPs, the reference amount is set to a value of 70% of the calculated power change amount. Therefore, when the cycle T is five ZVPs, the reference amount is set to about 650 W, and when the cycle T is six ZVPs, the reference amount is set to about 430 W. Note that, the reference amount is set to 70% of the calculated power change amount in the present embodiment, but the present invention is not limited to this embodiment. The same effect can be provided as long as the reference amount is set to an allowable power change amount (power change amount satisfying Pst=1) or less.

As described above, when the first and second oscillating circuits 7a and 7b are alternately operated in the cycle of five ZVPs, the output power of the induction heating device changes between 1.7 kW and 2.5 kW, and thus the power change amount is 800 W. Further, when the cycle T is six ZVPs, the output power is constant at 2 kW, and thus the power change amount is zero W. When these power change amounts are compared with the above reference amount, the power change in the operation of the induction heating device in the cycle of five ZVPs exceeds the reference value, and the power change in the operation of the induction heating device in the cycle of six ZVPs is not more than the reference amount. Therefore, the control circuit 10 determines that the alternate operations of the first and second oscillating circuits 7a and 7b in the cycle of six ZVPs in which the power change is not more than the reference amount are approved, and that the alternate operations in the cycle of five ZVPs in which the power change exceeds the reference amount are disapproved.

Note that, depending on the set powers of the first and second inverters 11a and 11b, the power change amount in the operation in the cycle of five ZVPs and the power change amount in the operation in the cycle of six ZVPs are both not more than the reference amount. In this case, there is no problem in suppressing the flicker of the light or the like in each operation. Thus, in the present embodiment, the induction heating device is operated in the cycle T in which the power change amount is smaller. Further, in the present embodiment, the set power is provided so that the power change amount is surely the reference amount or less, in either or both of the operations in the cycle of five ZVPs and in the cycle of six ZVPs, in all possible combinations of the set powers of the first and second inverters 11a and 11b. Therefore, a case where both of the power change amount in the operation in the cycle of five ZVPs and the power change amount in the operation in the cycle of six ZVPs exceed the reference amount does not occur.

Further, in the present embodiment, to control the drive time ratio (T1:T2) of the first and second oscillating circuits 7a and 7b, the drive cycle T of the first and second oscillating circuits 7a and 7b is adjusted. However, the present invention is not limited to this. The drive times T1 and T2 may be adjusted while the cycle T is fixed.

1-3. Conclusion of the Present Embodiment

As described above, the induction heating device according to the present embodiment includes the rectifying circuit 2 that rectifies an AC power supply; the smoothing capacitor 3 that smooths the rectified output to obtain a DC power supply; the first and a second inverters that invert the DC power supply to an alternate current by the first and second switching elements 6a, 6c, 6b, and 6d to supply high-frequency power, and connected to the smoothing capacitor 3 in parallel; the first and a second oscillating circuits 7a and 7b that supply drive signals to the switching elements 6a, 6c, 6b, and 6d in the first and a second inverters 11a and 11b; and a control circuit 10 that controls the drive of the first and second oscillating circuits. The controller alternately drives the first and second oscillating circuits 7a and 7b, and controls a drive time ratio of the first and second oscillating circuits 7a and 7b so that a power change amount generated every time the drive is switched between the first and second oscillating circuits 7a and 7b is not more than the reference amount. As a result, the power change amount generated due to the alternate drives of the two first and second inverters 11a and 11b can be suppressed. Thus, the flicker of the lighting equipment can be prevented from being generated, or controlled to the level in which the user does not feel strangeness.

Further, according to the induction heating device in the present embodiment, the power change amount generated every time the drive is switched between the first and second oscillating circuits 7a and 7b can be equal to or less than the power change amount corresponding to a voltage change rate of the AC power supply in which the short-time flicker value Pst is one. Thus, the power change amount generated due to the alternate drive of the two first and second inverters 11a and 11b can be equal to or less the border line whether people feel the flicker terrible. As a result, the flicker of the lighting equipment or the like can be prevented from being generated, or kept at the level in which the user does not feel strangeness.

Further, according to the induction heating device in the present embodiment, the cycle time T of the alternate drive of the first and second oscillating circuits 7a and 7b can be set to 300 milliseconds or less, and the number of the drive switching operations per minute can be set to 400 or more. As a result, during the intermittent operation in which the heating operation and the stop are alternately performed, the induction heating device can keep a degree of an off-and-on boiling state which is likely to be generated in the object to be heated particularly in boiling water or the like, at a level in which the user does not notice or does not feel strangeness. Thus, the user can be prevented from mistaking the intermittent boiling state for a defect of the equipment or the like.

Furthermore, the induction heating device according to the present embodiment includes the zero-volt detecting circuit 9 that detects the zero point of the AC power supply 1. The control circuit 10 switches the drive between the first and second oscillating circuits 7a and 7b, in the vicinity of the zero point of the AC power supply detected by the zero-volt detecting circuit 9. As a result, an instantaneous value of the AC power supply 1 at the time of switching the drive between the first and second oscillating circuits 7a and 7b is a voltage lower than the maximum value of the instantaneous value of the AC power supply 1, and thus a charge voltage to the smoothing capacitor 3 can be kept low. Therefore, an inrush current generated at the time of an initial operation of each of the first and second inverters 11a and 11b can be kept low, and thus an abnormal sound such as a pan rap or growl sound can be prevented from being generated.

2. Second Embodiment

Hereinafter, a second embodiment of the present invention will be described. Because a basic configuration of an induction heating device according to the present embodiment is the same as the configuration of the induction heating device according to the first embodiment, the same component is marked with the same reference sign, and its description is omitted. Further, because a basic operation of the induction heating device according to the present embodiment is the same as the operation of the induction heating device according to the first embodiment, its description is omitted.

As shown in FIG. 2G, in the induction heating device according to the present embodiment, the first inverter 11a outputs the power P1 in the period T1, and the second inverter 11b outputs the power P2 in the period T2. The output power of the induction heating device changes between the powers P1 and P2 every time the first and second oscillating circuits 7a and 7b are alternately operated. Since intermittent operation is performed such that the first inverter 11a is operated in the period of three ZVPs of the cycle of five ZVPs, the first inverter 11a outputs the average power of 3/5 time of the output power P1, in the cycle T. Further, since the intermittent operation is performed such that the second inverter 11b is operated in the period of two ZVPs of the cycle of five ZVPs, the second inverter 11b outputs the average power of 2/5 time of the output power P2, in the cycle T.

Hereinafter, a description will be given of an operation of the induction heating device according to the present embodiment performed when either one of the output powers of the first and second inverters 11a and 11b is limited. First, a description will be given of a case where either one of the output powers of the first and second inverters 11a and 11b is not limited, and then a description will be given of the case where the output power is limited.

2-1. Operation when Output Power of Inverter is not Limited

A description will be given of a case where the set powers of the first and second inverters 11a and 11b are 1.5 kW and 1 kW, respectively, with reference to FIGS. 5A to 5E. FIGS. 5A to 5E are views showing a change of the output power of the induction heating device generated when the set powers of the two inverters are 1.5 kW and 1 kW, respectively in this embodiment.

Referring to FIGS. 5A to 5E, FIG. 5A indicates a voltage level of the AC power supply 1, FIG. 5B indicates a detection signal (output signal) of the zero-volt detecting circuit 9, FIGS. 5C and 5D indicate operation states of the first and second oscillating circuits 7a and 7b, respectively, and FIG. 5E indicates an output power of the induction heating device.

As described above, the control circuit 10 controls the first and second oscillating circuits 7a and 7b so that the first and second oscillating circuits 7a and 7b are operated intermittently in the periods T1 and T2, respectively and alternately in the cycle of five ZVPs. The periods T1 and T2 are determined based on the respective set powers of the first and second inverters 11a and 11b. The determination method is as follows similar to the first embodiment. The operation period T1 of the first oscillating circuit 7a is calculated based on a following formula.

(Period $T1$)=(cycle $T$)×(set power of first inverter 11a)/(total of set powers of first and second inverters 11a and 11b)

Since lengths of the periods T1 and T2 are determined with the half cycle of the AC power supply using as the minimum unit, when the calculation result is indivisible, the calculation result is rounded off to the whole number. The operation period T2 of the second oscillating circuit 7b is calculated based on a following formula.

(Period $T2$)=(cycle $T$)−(period $T1$)

When the set powers of the first and second inverters 11a and 11b are respectively selected as 1.5 kW and 1 kW, the total of the set powers is 2.5 kW. Therefore, the operation periods T1 and T2 of the first and second oscillating circuits 7a and 7b are respectively calculated such that T1=three ZVPs, and T2=two ZVPs. Since the intermittent operation is performed such that the first inverter 11a is operated in the period of three ZVPs of the cycle of five ZVPs, in order that the first inverter 11a outputs the average power of 1.5 kW in the cycle T, the first inverter 11a needs to output a power of 5/3 times the set power in the period T1. Thus, the output power of the first inverter 11a is 2.5 kW in the period T1. Further, since the intermittent operation is performed such that the second inverter 11b is operated in the period of two ZVPs of the cycle of five ZVPs, in order that the second inverter 11b outputs the average power of 1 kW in the cycle T, the second inverter 11b needs to output a power of 5/2 times the set power in the period T2. Thus, the output power of the second inverter 11b is 2.5 kW in the period T2. Therefore, as shown in FIG. 5E, in the case where the set powers of the first and second inverters 11a and 11b are respectively set to 1.5 kW and 1 kW, even when the first and second oscillating circuits 7a and 7b are alternately operated, the output power of the induction heating device is constant at 2.5 kW.

2-2. Operation in Case where Output Power of Inverter is Limited

Next, a description will be given of a case where the set powers of the first and second inverters 11a and 11b are respectively selected as 1.5 kW and 1 kW, and the first inverter 11a is operated under a condition that a small-diameter pan or non-magnetic stainless pan is put on the first heating coil 4a, with reference to FIGS. 6A to 6E and FIGS. 7A to 7E. FIGS. 6A to 6E are views showing a change of the output power of the induction heating device when the first inverter 11a according to the present embodiment heats the small-diameter pan or the non-magnetic stainless pan. FIG. 7A to 7E are views showing a change of the output power of the induction heating device when the output power of the second inverter 11b is limited, based on a reference value of the power change according to the present embodiment.

When the small-diameter pan or the non-magnetic stainless pas is heated, a resonant current flowing in each of the first switching elements 6a and 6c, and the second switching elements 6b and 6d is larger, compared with a case where an iron pan such as a porcelain-clad pan is heated. Thus, depending on the output power, the switching element could be broken. To prevent the switching element from being broken, the induction heating device according to the present embodiment includes a protecting means that prevents the resonant current flowing in each of the first switching elements 6a and 6c and the second switching element 6b and 6d from reaching a predetermined amount or more. That is, the induction heating device detects values of the resonance voltages generated in the first and second resonance capacitors 5a and 5b by the first and second resonance voltage detecting circuits 13a and 13b to limit the output powers of the first and second inverters 11a and 11b.

For example, a case where the first switching elements 6a and 6c and the second switching elements 6b and 6d could be broken when the output powers of the first and second inverters 11*a* and 11*b* are 1.5 kW or more will be considered. In this case, as shown in FIGS. 6A to 6E, the output power of the first inverter 11*a* is limited to 1.5 kW in the period T1, instead of original 2.5 kW. Thus, as shown in FIG. 6E, the output power of the induction heating device changes between 1.5 kW and 2.5 kW every time the first and second oscillating circuits 7*a* and 7*b* are alternately operated.

Note that the output powers of the first and second inverters 11*a* and 11*b* are limited by reducing duty ratios in switching the first switching elements 6*a* and 6*c* and the second switching elements 6*b* and 6*d*.

When the change amount of the output power of the induction heating device exceeds the reference amount due to the limitation of the output power of the first inverter 11*a*, the control circuit 10 limits the output power of the second inverter 11*b* so that the power change amount is the reference amount or less. Here, the reference amount is previously determined similar to the first embodiment.

Hereinafter, a specific description will be given of the reference amount for the power change amount used in limiting the output power of the second inverter 11*b*. When an equipment having a relatively high load such as the induction heating device or the like is operated, a light such as an incandescent lamp is dimmed in some cases. This is because a large current flows due to the operation of the equipment and thus the AC power supply voltage is lowered. To prevent such flicker of the light, there is an international standard to limit the change in the current consumption of an equipment. Particularly, there is an index called the short-time flicker indicator Pst in which severity of the flicker is quantified based on characteristics of the human eyes. The short-time flicker indicator Pst is a graph in which a border line indicating whether the human feels the flicker terrible is defined as one. In general, the abscissa axis of the graph of the short-time flicker indicator Pst indicates number of step-shaped voltage changes per minute, and the ordinate axis indicates a magnitude of a voltage change in percent of a rated voltage. When the AC power supply 1 according to the present embodiment is 240 V/50 Hz, and the cycle T is five ZVPs, the number of the switching operations between the first and second oscillating circuits 7*a* and 7*b* per minute is 2400, as described above. Thus, the number of the voltage changes is also 2400. Here, according to the short-time flicker indicator Pst, when the number of the voltage changes per minute is 2400, the magnitude of the voltage change on the border line (Pst=1) is 0.75%. Therefore, the power change amount corresponding to the magnitude of the voltage change of 0.75% which satisfies that Pst=1 is calculated from impedance Zref=0.47Ω (=0.4Ω+jn 0.25Ω) to be about 900 W through a following calculation.

(Voltage change amount)=(rated voltage)×(magnitude of voltage change satisfying that $Pst=1$)=240 (V)×0.75(%)/100=1.8 (V)

(Current change amount)=(voltage change amount)/Zref=1.8 (V)/0.47(Ω)=3.83 (A)

(Power change amount)=(rated voltage)×(current change amount)=240 (V)×3.83 (A)=919 (W)

The reference amount is set to be not more than the calculated power change amount. In the present embodiment, the reference amount is set to a value of about 50% of the calculated power change amount. Thus, the reference amount is set to 400 W. Note that, the reference amount is set to 50% of the calculated power change amount in the present embodiment, but the present invention is not limited to this embodiment. The same effect can be provided as long as the reference amount is set to an allowable power change amount (power change amount satisfying Pst=1) or less.

Based on the reference amount (400 W) set as described above, and the output power (1.5 kW) of the first inverter 11*a*, a maximum value which can be set as the output power of the second inverter 11*b* is determined as 1.9 kW (1.5 kW+0.4 kW). Thus, the control circuit 10 limits the output power of the second inverter 11*b* to 1.9 kW, and alternately operates the first and second inverters 11*a* and 11*b*. As a result, as shown in FIG. 7E, the output power of the induction heating device changes between 1.5 kW and 1.9 kW every time the first and second oscillating circuits 7*a* and 7*b* are alternately operated. Therefore, the power change amount is reduced from 1000 W (2.5 kW-1.5 kW) to 400 W (1.9 kW-1.5 kW) which is not more than the reference amount.

Note that, the present embodiment discloses the means for detecting the values of the resonance voltages generated in the first and second resonance capacitors 5*a* and 5*b* as the means for protecting the first switching elements 6*a* and 6*c* and the second switching elements 6*b* and 6*d*, but the present invention is not limited to this means. A current transformer or the like may be provided in a current path of the resonant current, and thereby the values of the currents flowing in the first switching elements 6*a* and 6*c* and the second switching elements 6*b* and 6*d* may be directly detected. The same effect can be also provided by this means, as a matter of course.

2-3. Conclusion of the Present Embodiment

As described above, the induction heating device according to the present embodiment includes the rectifying circuit 2 that rectifies an AC power supply 1; the smoothing capacitor 3 that smooths the rectified output to obtain a DC power supply; the first and second inverters 11*a* and 11*b* composed of the first and second heating coils 4*a* and 4*b*, the first and second resonance capacitors 5*a* and 5*b*, and the first switching elements 6*a* and 6*c* and the second switching elements 6*b* and 6*d*, and connected to the smoothing capacitor 3 in parallel; the first and second oscillating circuits 7*a* and 7*b* that supply the drive signals to the first switching elements 6*a* and 6*c*, and the second switching elements 6*b* and 6*d*; and the control circuit 10 that controls the drive of the first and second oscillating circuits 7*a* and 7*b*. The control circuit 10 alternately drives the first and second oscillating circuits 7*a* and 7*b*, and when one output power of the first or second inverter 11*a* or 11*b* is limited to a power smaller than a power required to obtain a set power, the control circuit 10 limits the other output power of the first or second inverter 11*a* or 11*b* so that a difference between the output power of the first inverter 11*a* and the output power of the second inverter 11*b* is not more than the predetermined amount. As a result, the flicker of the lighting equipment or the like can be prevented from being generated, or kept at the level in which the user does not feel strangeness.

Further, the induction heating device according to the present embodiment, similarly to the first embodiment, makes a difference between the output powers of the first and second inverters 11*a* and 11*b* into a power amount corresponding to a voltage change rate of the AC power supply in which a short-time flicker value Pst is one. As a result, the induction heating device can limit a power change amount generated due to the alternate drive of the two first and second inverters 11*a* and 11*b* the border line whether people feel the flicker terrible or less. Therefore, the flicker of the lighting equipment or the like can be prevented from being generated, or kept a level in which a user does not feel strangeness.

Further, the induction heating device according to the present embodiment, similarly to the first embodiment, controls the first and second oscillating circuits 7a and 7b so that the cycle T is 300 milliseconds or less, and the number of the switching operations between the first and second oscillating circuits 7a and 7b per minute is 400 or more. As a result, the induction heating device can suppress an off-and-on boiling state which is likely to be generated in an object to be heated particularly in boiling water or the like to a level in which a user does not notice or does not feel strangeness. Therefore, the user can be prevented from mistaking the intermittent boiling state for a defect of the equipment or the like.

Further, the induction heating device according to the present embodiment, similarly to the first embodiment, includes the zero-volt detecting circuit 9 that detects the zero point of the AC power supply 1. The control circuit 10 switches the drive between the first and second oscillating circuits 7a and 7b, in the vicinity of the zero point of the AC power supply. As a result, the instantaneous value of the AC power supply 1 at the time of switching the drive between the first and second oscillating circuits 7a and 7b is a voltage lower than the maximum value of the instantaneous value of the AC power supply 1, and thus a charge voltage to the smoothing capacitor 3 can be kept low. Therefore, the rush current generated at the time of an initial operation of each of the first and second inverters 11a and 11b can be lowered, so that an abnormal sound such as a pan rap or growl sound can be prevented from being generated.

INDUSTRIAL APPLICABILITY

As described above, the induction heating device according to the present invention can prevent a flicker such as a flicker of a lighting equipment caused by the power change generated due to the alternate drive of the two inverters. Therefore, the present invention can also be applied to an industrial or household induction heating device which is operated with alternate drive of the two inverters.

The invention claimed is:
1. An induction heating device comprising:
a rectifying circuit that rectifies an AC power supply;
a smoothing capacitor that smooths the rectified output to obtain a DC power supply;
a first and a second inverters each composed of a heating coil, a resonance capacitor, and a switching element, and connected to the smoothing capacitor in parallel;
a first and a second oscillating circuits that supply a first and a second drive signals to the switching elements respectively, the first and second drive signals each having a driving period in which driving pulses are supplied and a driving stop period in which the driving pulses are not supplied; and
a controller that controls drive of the first and second oscillating circuits,
wherein the controller alternately drives the first and second oscillating circuits, and varies a ratio of the driving period of the first drive signal to the driving period of the second drive signal in accordance with a power change amount generated every time the drive is switched between the first and second oscillating circuits so that the power change amount is not more than a predetermined amount.

2. The induction heating device according to claim 1, wherein the controller alternately drives the first and second oscillating circuits, and when one output power of the first or second inverter is limited to a power smaller than a power required to obtain a set power, the controller reduces the other output power of the first or second inverter so that a difference between the output power of the first inverter and the output power of the second inverter is not more than the predetermined amount.

3. The induction heating device according to claim 1, wherein the predetermined amount is not more than a power amount corresponding to a voltage change rate of the AC power supply in which a short-time flicker value Pst is one.

4. The induction heating device according to claim 1, wherein the controller performs control such that a cycle time of the alternate drive of the first and second oscillating circuits is not more than 300 milliseconds, and number of drive switching operations between the first and second oscillating circuits per minute is not less than 400.

5. The induction heating device according to claim 1, further comprising a zero-volt detecting circuit that detects a zero point of the AC power supply, wherein the controller switches the drive between the first and second oscillating circuits, based on timing at which the zero point of the AC power supply is detected by the zero-volt detecting circuit.

* * * * *